United States Patent
Christie et al.

(10) Patent No.: US 8,091,045 B2
(45) Date of Patent: Jan. 3, 2012

(54) SYSTEM AND METHOD FOR MANAGING LISTS

(75) Inventors: Greg Christie, San Jose, CA (US); Scott Forstall, Mountain View, CA (US); Stephen O. Lemay, San Francisco, CA (US); Bas Ording, San Francisco, CA (US); Marcel Van Os, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 948 days.

(21) Appl. No.: 11/770,725

(22) Filed: Jun. 28, 2007

(65) Prior Publication Data

US 2008/0165136 A1 Jul. 10, 2008

Related U.S. Application Data

(60) Provisional application No. 60/883,808, filed on Jan. 7, 2007, provisional application No. 60/879,469, filed on Jan. 8, 2007, provisional application No. 60/879,253, filed on Jan. 7, 2007.

(51) Int. Cl.
*G06F 3/033* (2006.01)
*G06F 3/03* (2006.01)

(52) U.S. Cl. ........ 715/863; 715/767; 715/769; 715/788; 715/864

(58) Field of Classification Search .......... 715/710, 715/764, 767, 769, 781, 788, 804, 863, 864, 715/810

See application file for complete search history.

(56) References Cited

U.S. PATENT DOCUMENTS

| | | | |
|---|---|---|---|
| 5,760,773 A | 6/1998 | Berman et al. | 345/347 |
| 5,809,267 A * | 9/1998 | Moran et al. | 715/863 |
| 5,867,150 A | 2/1999 | Bricklin et al. | 345/173 |
| 5,914,718 A * | 6/1999 | Chiu et al. | 715/863 |
| 6,094,197 A | 7/2000 | Buxton et al. | 345/358 |
| 6,525,749 B1 * | 2/2003 | Moran et al. | 715/863 |
| 6,590,568 B1 | 7/2003 | Astala et al. | 345/173 |
| 6,883,145 B2 * | 4/2005 | Jaeger | 715/767 |
| 6,959,425 B1 * | 10/2005 | Krauklis | 715/864 |
| 7,117,451 B2 * | 10/2006 | Sielken | 715/788 |

(Continued)

FOREIGN PATENT DOCUMENTS

WO  WO 00/16186 A2  3/2000

(Continued)

OTHER PUBLICATIONS

Flow State, "Some Basic UI Patterns for Preventing Accidental Deletion," Oct. 16, 2006, 3 pages, http://miksovsky.blog.com/flowstate/2006/02/some_basic_ui_p.html.

(Continued)

*Primary Examiner* — Nicholas Augustine

(74) *Attorney, Agent, or Firm* — Morgan, Lewis & Bockius LLP

(57) ABSTRACT

A computer-implemented method for displaying and managing lists on a portable multifunction device with a touch screen display includes displaying a list of items, detecting a finger contact on a moving-affordance icon, detecting movement of the finger contact on the touch screen display, and in response to detecting the movement of the finger contact, moving the moving-affordance icon and the corresponding item in the list in accordance with the movement of the finger contact. In some embodiments, at least some of the items have corresponding moving-affordance icons.

19 Claims, 13 Drawing Sheets

U.S. PATENT DOCUMENTS

| | | | |
|---|---|---|---|
| 7,680,814 B2 * | 3/2010 | Mercer et al. | 84/609 |
| 7,693,724 B2 * | 4/2010 | Bryant | 705/315 |
| 7,707,231 B2 * | 4/2010 | LaChapelle et al. | 707/804 |
| 7,716,579 B2 * | 5/2010 | Gunn et al. | 715/256 |
| 2002/0178191 A1 * | 11/2002 | Sielken | 707/530 |
| 2004/0140956 A1 | 7/2004 | Kushler et al. | 345/168 |
| 2005/0134578 A1 | 6/2005 | Chambers et al. | 345/184 |
| 2006/0053387 A1 | 3/2006 | Ording | 715/773 |
| 2006/0080386 A1 | 4/2006 | Roykkee et al. | 709/203 |
| 2006/0101354 A1 | 5/2006 | Hashimoto et al. | 715/863 |
| 2007/0036346 A1 | 2/2007 | Kwon | 379/413 |
| 2007/0101292 A1 * | 5/2007 | Kupka | 715/810 |
| 2007/0157094 A1 | 7/2007 | Lemay et al. | 715/717 |
| 2009/0024233 A1 * | 1/2009 | Shirai et al. | 700/94 |

FOREIGN PATENT DOCUMENTS

| | | |
|---|---|---|
| WO | WO 01/75568 A1 | 10/2001 |
| WO | WO 03/032139 A2 | 4/2003 |

OTHER PUBLICATIONS

International Search Report dated Dec. 28, 2007, received in International Application No. PCT/US2007/077776, which corresponds to U.S. Appl. No. 11/850,642.

Office Action dated Oct. 1, 2010, received in U.S. Appl. No. 11/850,642.

Office Action dated Oct. 13, 2010, received in Chinese Patent Application No. 200780041226.4, which corresponds to U.S. Appl. No. 11/850,642.

Wikipedia, "Safari (web browser)," Wikipedia, the free encyclopedia, last modified Aug. 28, 2009, 15 pages, http://en.wikipedia.org/wiki/Safari_(web_browser).

Examiner's Report dated Mar. 30, 2010, received in Australian Patent Application No. 2007342102, which corresponds to U.S. Appl. No. 11/770,725, 4 pages.

Office Action dated Dec. 8, 2009, received in European Patent Application No. 07 870 030.9, which corresponds to U.S. Appl. No. 11/770,725.

International Search Report and Written Opinion for International Application No. PCT/US2007/089023, mailed Jul. 11, 2008.

Notice of Allowance dated Jan. 28, 2011, received in U.S. Appl. No. 11/850,642.

Office Action dated Jun. 27, 2011, received in European Application No. 07 870 030.9, which corresponds to U.S. Appl. No. 11/770,725.

Office Action dated May 5, 2011, received in Chinese Patent Application No. 200780041226.4, which corresponds to U.S. Appl. No. 11/850,642.

Grant for Invention Patent dated Jul. 27, 2011, received in Chinese Patent Application No. ZL200780041226.4, which corresponds to U.S. Appl. No. 11/850,642.

Office Action dated Jun. 29, 2011, received in European Application No. 07 841 983.5, which corresponds to U.S. Appl. No. 11/850,642.

* cited by examiner

SYSTEM AND METHOD FOR MANAGING LISTS

RELATED APPLICATIONS

This application claims priority to U.S. Provisional Patent Application Nos. 60/883,808, "System and Method for Managing Lists," filed Jan. 7, 2007; 60/879,469, "Portable Multifunction Device," filed Jan. 8, 2007; and 60/879,253, "Portable Multifunction Device," filed Jan. 7, 2007. All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein.

TECHNICAL FIELD

The disclosed embodiments relate generally to portable electronic devices, and more particularly, to portable devices with digital (finger) selection and manipulation of selected items on a touch screen display.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Furthermore, portable communication devices with touch screens typically include a stylus for manipulating and selecting items on the touch screen itself. The styluses are typically separate from the device and are usually stored in the device within a compartment built to hold the stylus. Because such devices are designed to read the precise pinpoint contact of the stylus (when a user makes a selection on the touch screen with the stylus), making selections on the touch screen of the device without a stylus, for example, with a user's finger, can prove to be somewhat difficult.

Accordingly, there is a need for portable multifunction devices with more transparent and intuitive user interfaces for digital (finger) selection and manipulation of selected items on a touch screen display that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method for displaying and managing lists on a portable multifunction device with a touch screen display includes displaying a list of items, detecting a finger contact on a moving-affordance icon, detecting movement of the finger contact on the touch screen display, and in response to detecting the movement of the finger contact, moving the moving-affordance icon and the corresponding item in the list in accordance with the movement of the finger contact. In some embodiments, at least some of the items have corresponding moving-affordance icons.

In accordance with other embodiments, a graphical user interface on a portable multifunction device with a touch screen display includes a list of items on the touch screen display and moving-affordance icons for corresponding items in the list. In response to detecting a finger contact on a moving-affordance icon and detecting movement of the finger contact, the moving-affordance icon and the corresponding item in the list are moved in accordance with the movement of the finger contact.

In accordance with other embodiments, a portable multifunction device includes a touch screen display, one or more processors, memory, and one or more programs stored in the memory and configured to be executed by the one or more processors. The one or more programs include instructions for the following: displaying a list of items; detecting a finger contact on a moving-affordance icon; detecting movement of the finger contact on the touch screen display; and moving the moving-affordance icon and the corresponding item in the list in accordance with the movement of the finger contact in response to detecting the movement of the finger contact. In some embodiments, at least some of the items have corresponding moving-affordance icons.

In accordance with yet other embodiments, a computer-program product includes a computer readable storage medium and a computer program mechanism embedded therein. The computer program mechanism includes instructions, which when executed by a portable multifunction device with a touch screen display, cause the device to perform the following steps: display a list of items; detect a finger contact on a moving-affordance icon; detect movement of the finger contact on the touch screen display; and in response to detecting the movement of the finger contact, move the moving-affordance icon and the corresponding item in the list in accordance with the movement of the finger contact. In some embodiments, at least some of the items have corresponding moving-affordance icons.

In accordance with other embodiments, a portable multifunction device with a touch screen display includes means for the following: displaying a list of items, wherein at least some of the items have corresponding moving-affordance icons; detecting a finger contact on a moving-affordance icon; detecting movement of the finger contact on the touch screen display; and moving the moving-affordance icon and the corresponding item in the list in accordance with the movement of the finger contact in response to detecting the movement of the finger contact.

In accordance with yet other embodiments, a computer-implemented method for displaying and managing lists on a portable multifunction device with a touch screen display includes displaying a list of items on the touch screen display, detecting a finger contact on an item in the list, wherein the finger contact is stationary for more than a predetermined time, detecting movement of the finger contact on the touch screen display after the predetermined time, and in response to detecting the movement of the finger contact, moving the item in the list in accordance with the movement of the finger contact. In some embodiments, the method may include detecting a break of the finger contact on the touch screen display at a break location on the touch screen display, and in response to detecting the break, placing the item in the list at a position corresponding to the break location on the touch screen display.

A graphical user interface on a portable multifunction device with a touch screen display comprises a list of items on the touch screen display. In response to detecting a finger contact on an item, wherein the finger contact is stationary for more than a predetermined time, and detecting movement of the finger contact after the predetermined time, the item is moved in accordance with the movement of the finger contact.

A portable multifunction device comprises a touch screen display, one or more processors, memory, and one or more programs. The one or more programs are stored in the memory and configured to be executed by the one or more processors. The one or more programs include instructions for displaying a list of items on the touch screen display; instructions for detecting a finger contact on an item in the list, wherein the finger contact is stationary for more than a predetermined time; instructions for detecting movement of the finger contact on the touch screen display after the predetermined time; and instructions for moving the item in the list in accordance with the movement of the finger contact in response to detecting the movement of the finger contact.

A computer-program product comprises a computer readable storage medium and a computer program mechanism embedded therein. The computer program mechanism comprises instructions, which when executed by a portable multifunction device with a touch screen display, cause the device to display a list of items on the touch screen display; to detect a finger contact on an item in the list, wherein the finger contact is stationary for more than a predetermined time; to detect movement of the finger contact on the touch screen display after the predetermined time; and to move the item in the list in accordance with the movement of the finger contact in response to detecting the movement of the finger contact.

A portable multifunction device with a touch screen display comprises means for displaying a list of items on the touch screen display; means for detecting a finger contact on an item in the list, wherein the finger contact is stationary for more than a predetermined time; means for detecting movement of the finger contact on the touch screen display after the predetermined time; and means for moving the item in the list in accordance with the movement of the finger contact in response to detecting the movement of the finger contact.

Thus, the invention provides an intuitive, easy-to-use interface for displaying and managing lists on a portable electronic device with a touch screen display. In accordance with the embodiments of the present inventions, various lists may be easily re-arranged or re-ordered with simple finger gestures without the need for other tools or instruments.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
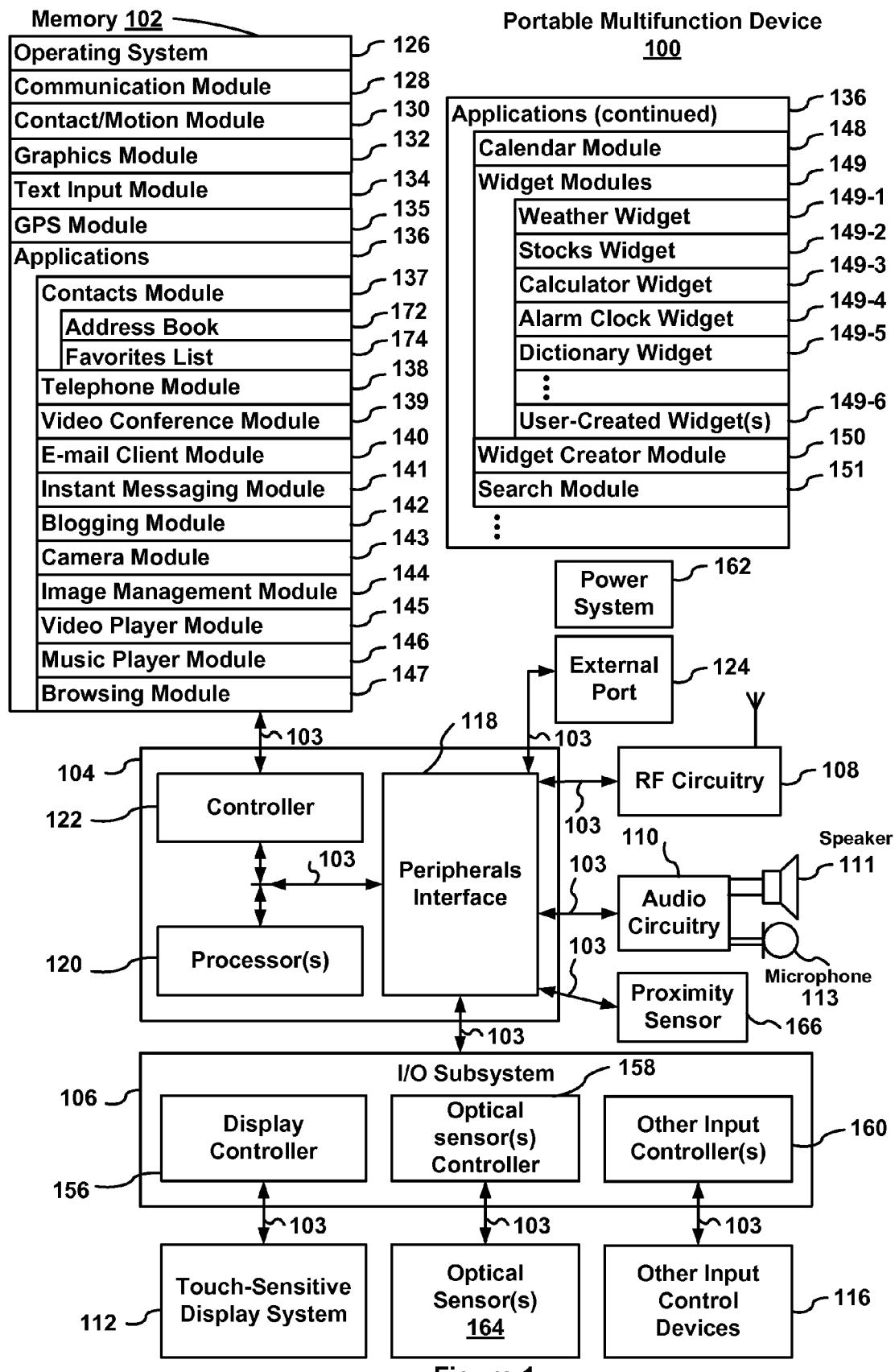
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. Nos.: 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone module 138 for use in location-based dialing, to camera module 143 and/or blogging module 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (which manages an address book 172 or contact list, as well as a list of favorite contacts 174);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book 172 or contact list, including: adding name(s) to the address book 172; deleting name(s) from the address book 172; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 172, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
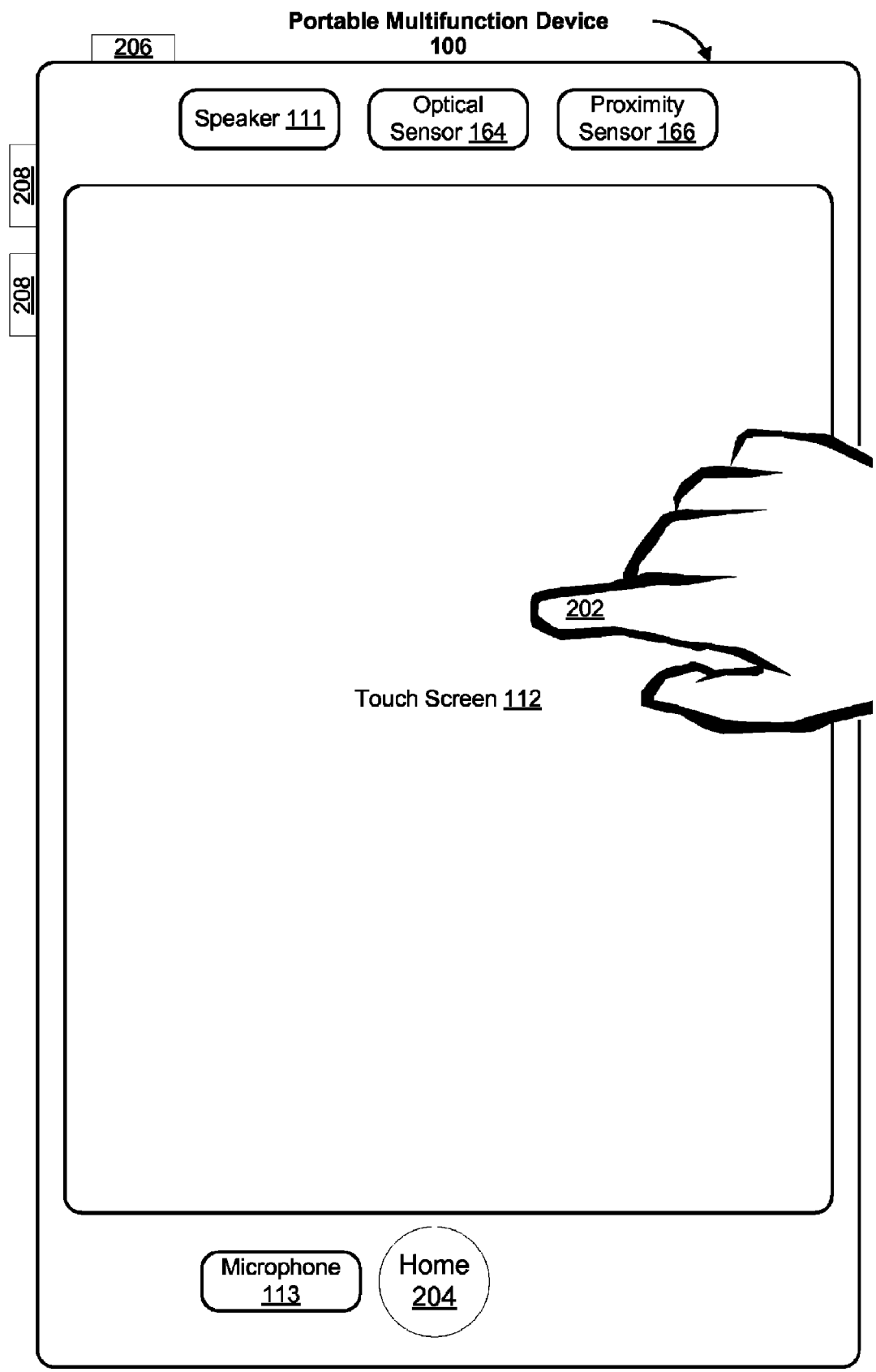
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
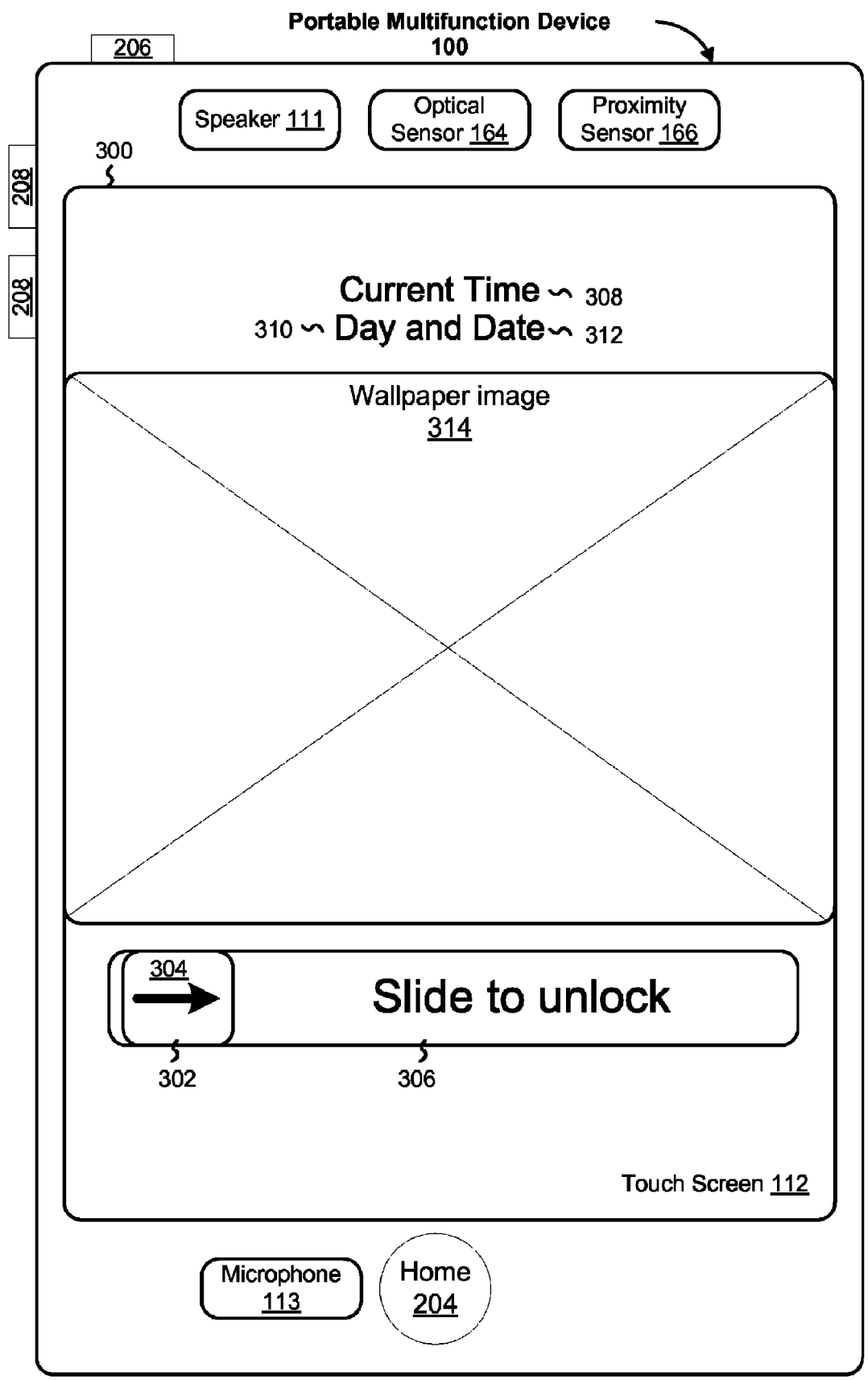
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
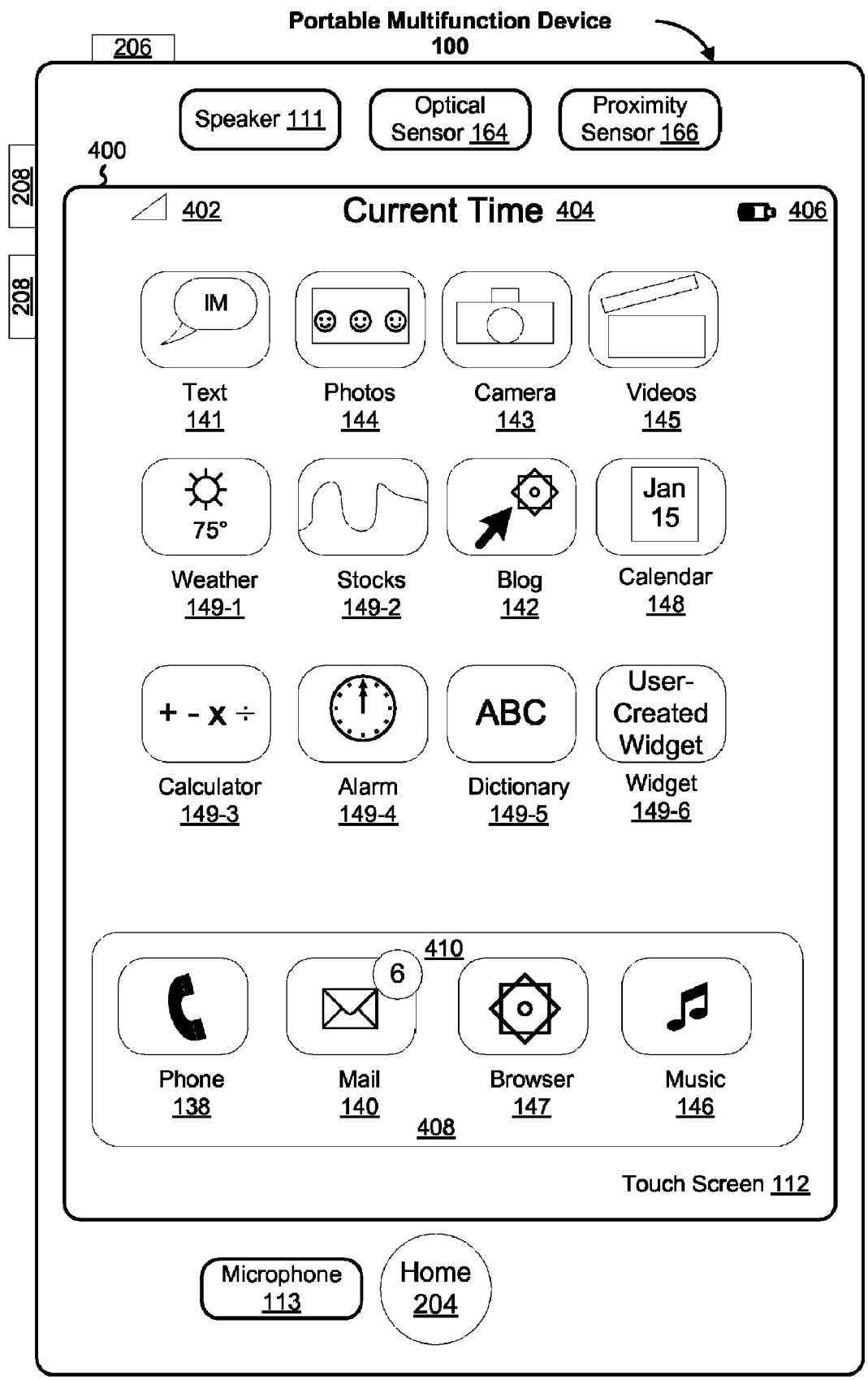
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;

Tray 408 with icons for frequently used applications, such as:
- Phone 138;
- E-mail client 140, which may include an indicator 410 of the number of unread e-mails;
- Browser 147; and
- Music player 146; and
- Icons for other applications, such as:
- IM 141;
- Image management 144;
- Camera 143;
- Video player 145;
- Weather 149-1;
- Stocks 149-2;
- Blog 142;
- Calendar 148;
- Calculator 149-3;
- Alarm clock 149-4;
- Dictionary 149-5; and
- User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

FIGS. 5A-5F illustrate an exemplary user interface for displaying and managing favorite contacts on portable multifunction device 100 in accordance with some embodiments. UI 2700A displays an exemplary list of favorites, corresponding to favorites list 174. It is noted that the terms "favorite" and "favorites" are sometimes used as a short hand for "favorite contact" and "favorite contacts." In some embodiments, each row 2720 in the list that corresponds to a favorite includes the name 2702 of the favorite, the type of phone number 2704 for the favorite that will be called, an additional information icon 2706, and an edit initiation icon 2710. In some embodiments, in response to the user activating icon 2706 for a particular favorite (e.g., by a finger tap on the icon), the touch screen displays the corresponding contact list entry for that favorite. In some embodiments, in response to a user tap or other predefined gesture elsewhere (i.e., a tap or gesture other than on icon 2702) in the row corresponding to a particular favorite, the phone module dials the corresponding phone number 2704 for that particular favorite. When a user makes a finger gesture on the edit initiation icon 2710, a moving-affordance icon 2722 is displayed on the touch screen display as seen in FIGS. 5B-5F.

In some embodiments, in response to the user activating add favorite icon 2708 (e.g., by a finger tap on the icon), the device displays the user's contact list, from which the user selects the contact list entry for a new favorite and a phone number in the entry for the new favorite.

Figure 5A:
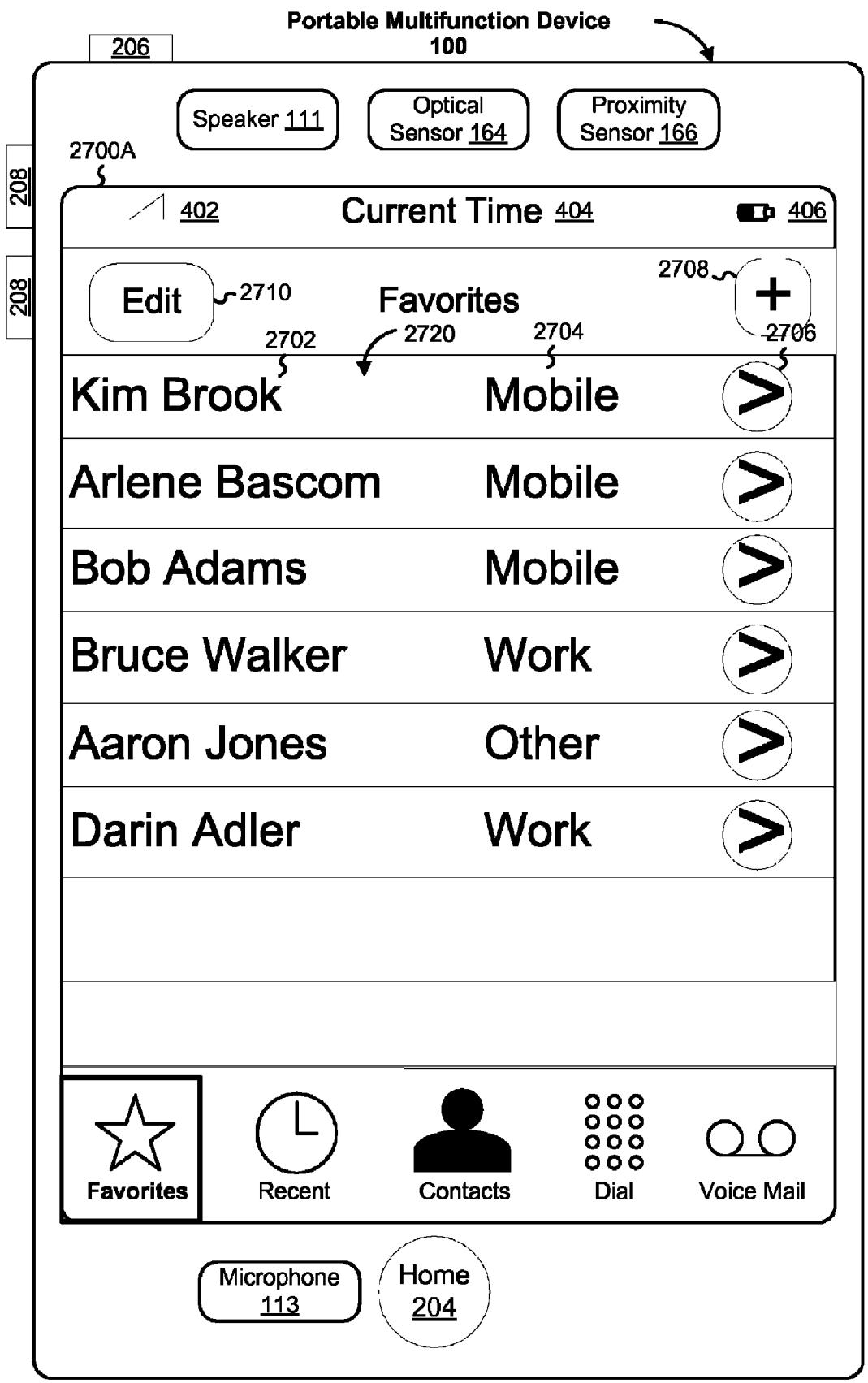
FIGS. 5A-5F illustrate an exemplary user interface for displaying and managing favorite contacts in accordance with some embodiments.
Figure 5B:
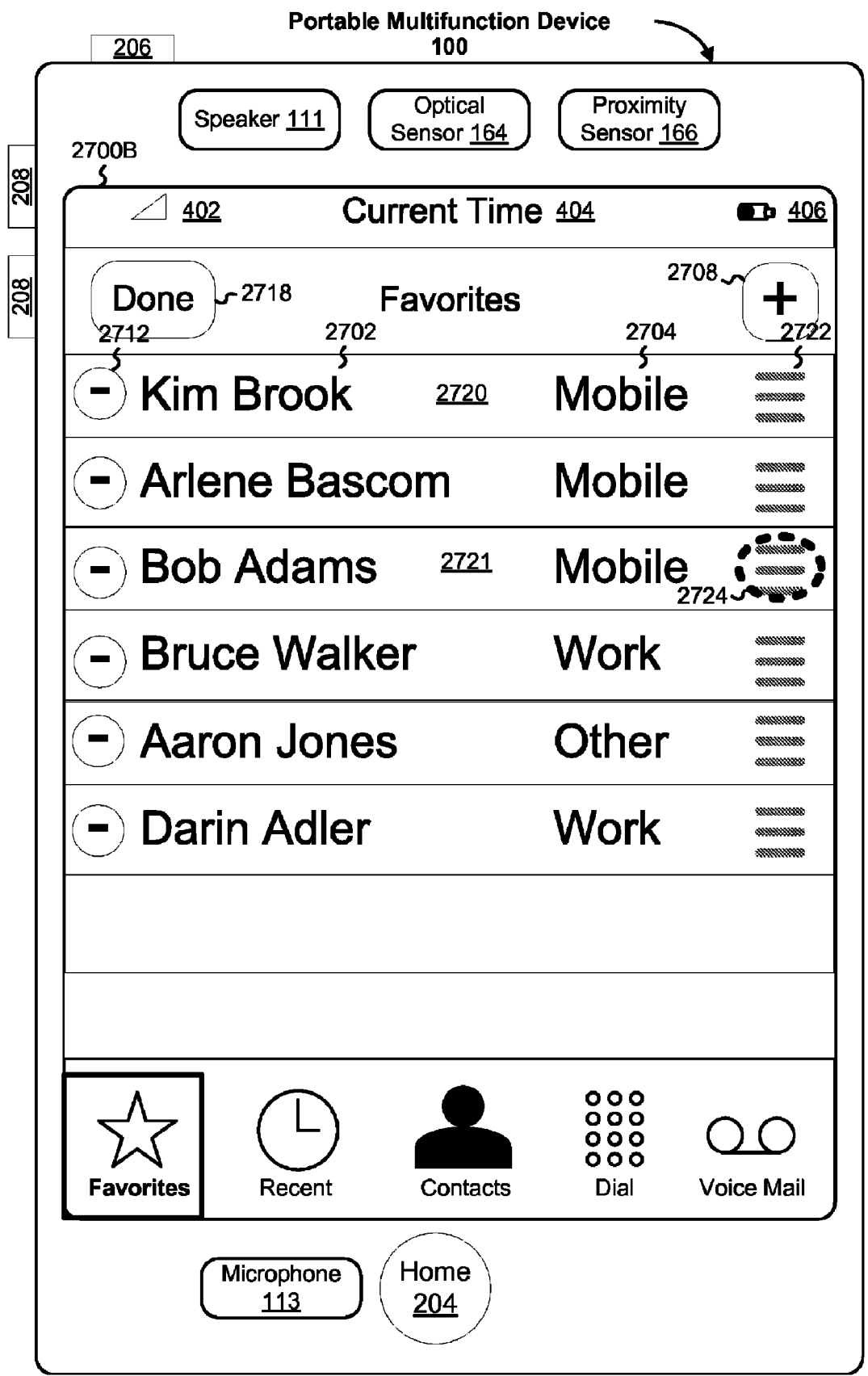
Figure 5C:
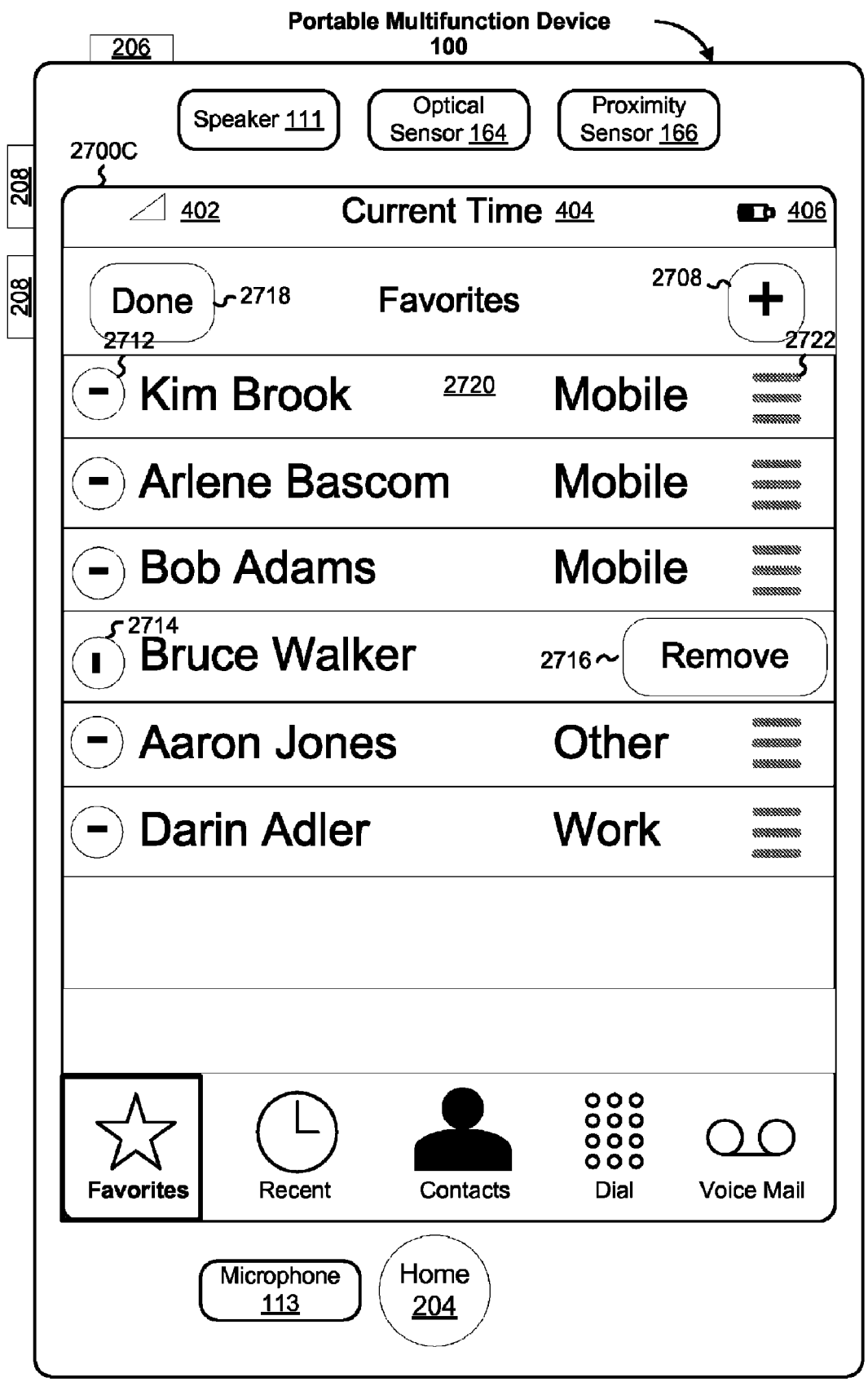

In response to the user activating the edit initiation icon 2710 (e.g., by a finger tap on the icon), the touch screen displays a delete icon 2712 next to the favorites (e.g., UI 2700B, FIG. 5B). If a user activates a delete icon (e.g., by tapping it with a finger), the icon may rotate 90 degrees (e.g., 2714, FIG. 5C) or otherwise change its appearance and/or a second icon may appear (e.g., remove icon 2716, FIG. 5C). If the user activates the second icon, the corresponding favorite is deleted. A deletion process that requires multiple gestures by the user on different parts of the touch screen (e.g., delete icon 2714 and remove icon 2716 are on opposite sides of the touch screen in UI 2700C) greatly reduces the chance that a user will accidentally delete a favorite or other similar item. The user activates the done icon (also called the edit completion icon) 2718 (e.g., by tapping on it with a finger) when the user has finished deleting favorites and the device returns to UI 2700A.

In some embodiments, as mentioned above, when a user performs a finger gesture on the edit initiation icon 2710, the touch screen display displays a moving-affordance icon 2722 as shown in FIGS. 5B-5F. After the moving-affordance icon 2722 is displayed on the touch screen display, the user may then execute a finger contact 2724 on the moving-affordance icon 2722. As the user's finger remains on the moving-affordance icon 2722, the user may move the corresponding row 2721 vertically within the list.

Figure 5D:
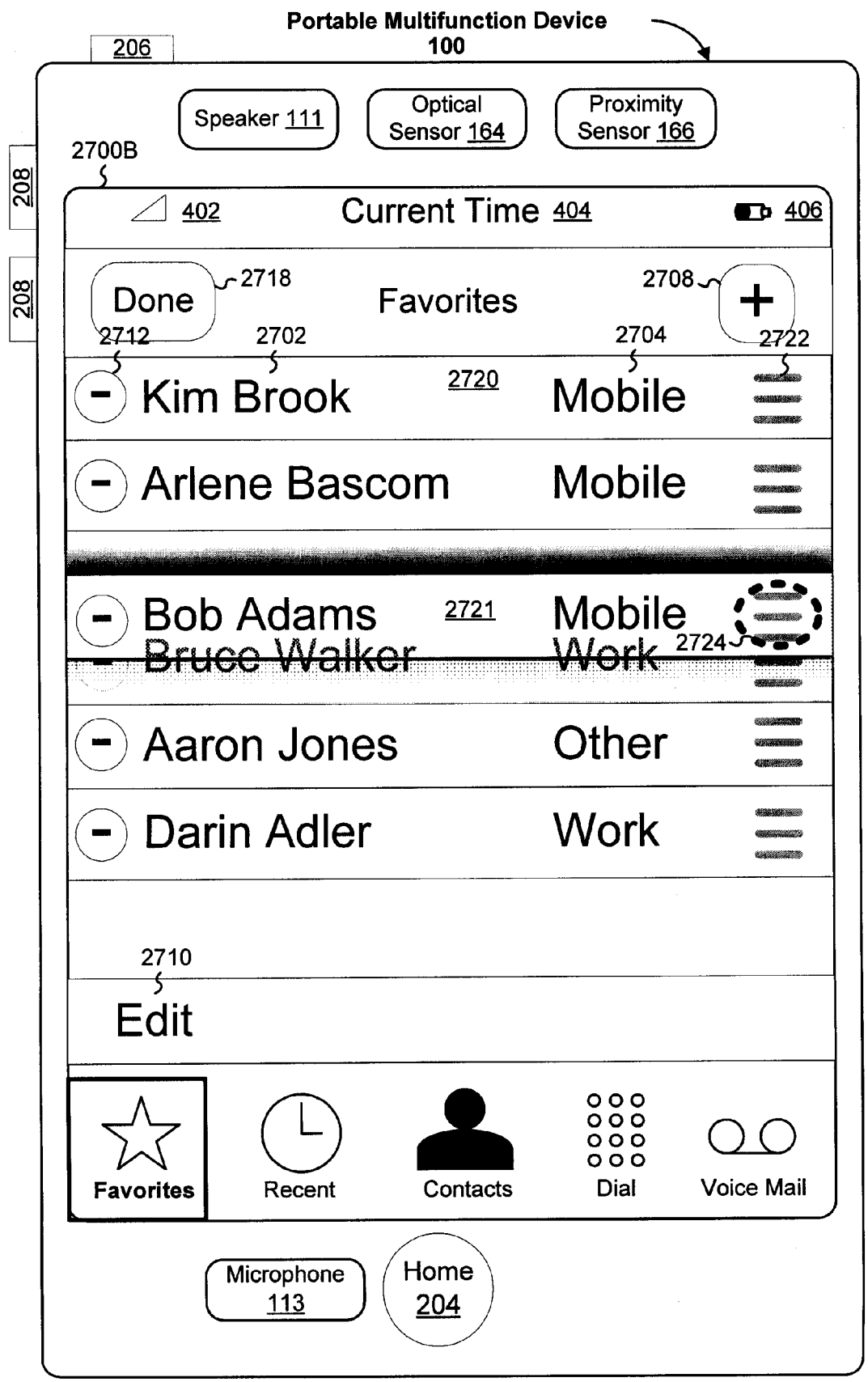
Figure 5E:
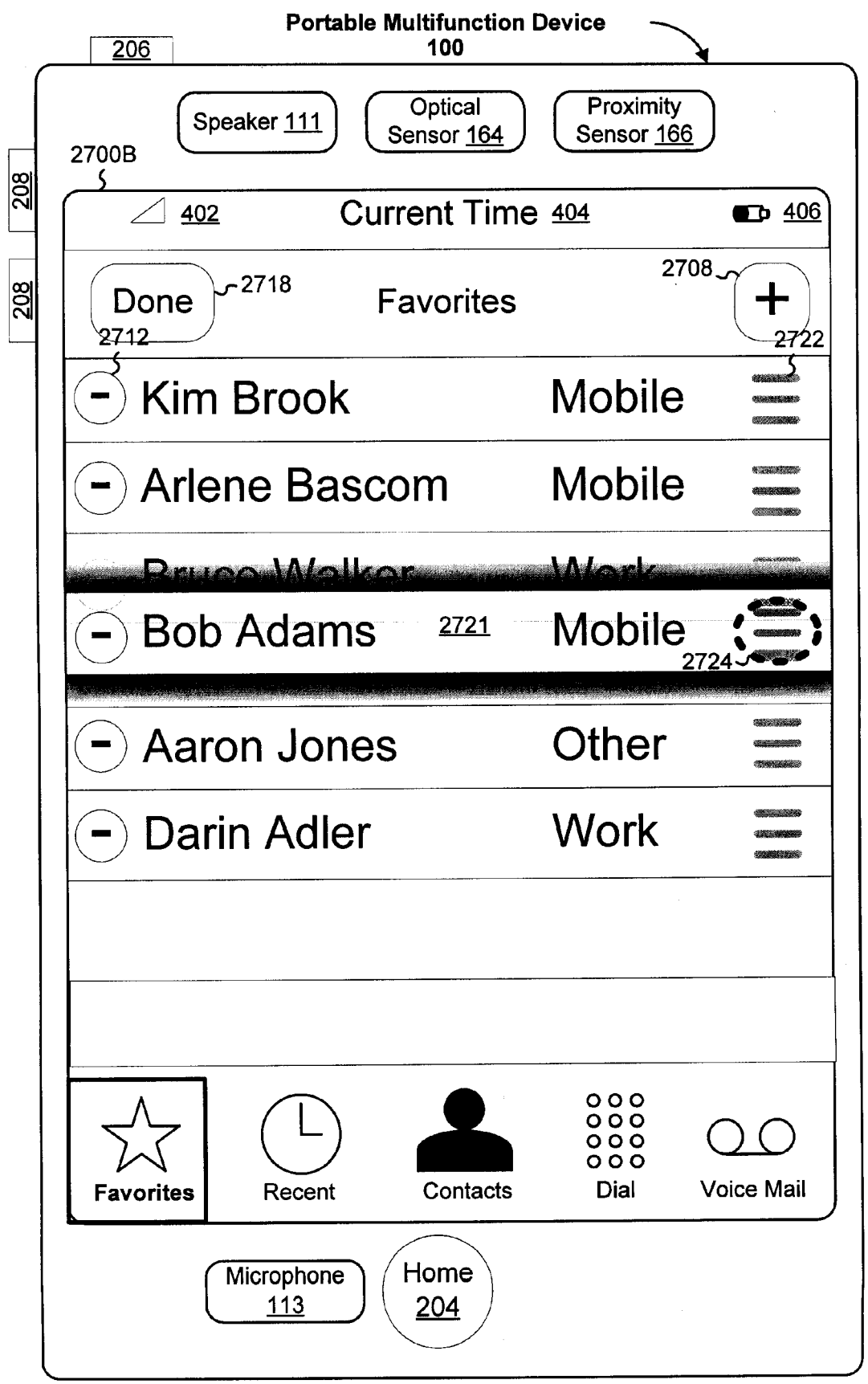
Figure 5F:
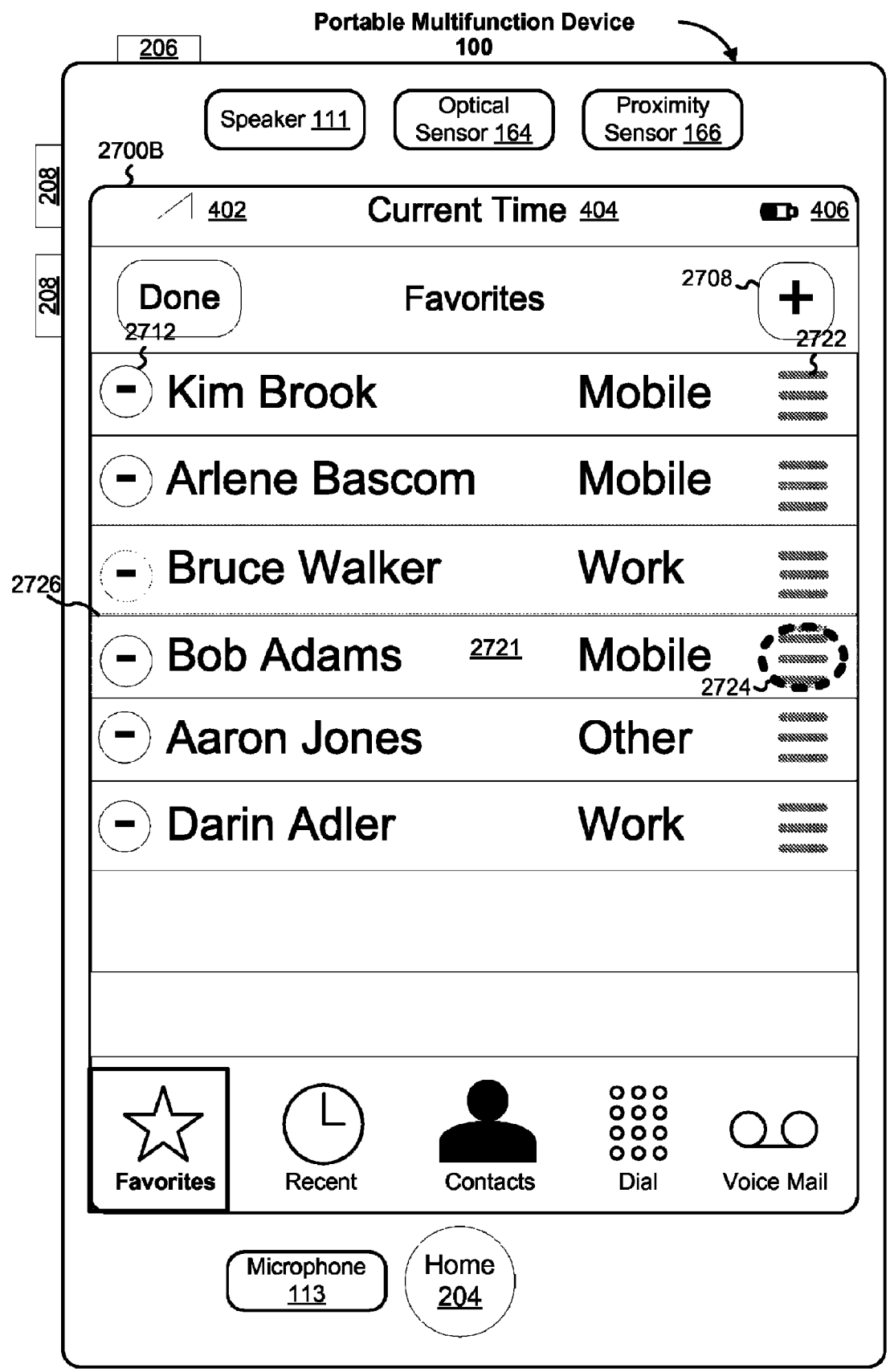

As shown in FIG. 5D-5F, the user may use his finger to move the corresponding row 2721 anywhere within the list and re-arrange the order of items of that list. Upon detection of the initial finger contact 2724 and movement through the list, the corresponding row separates from the list as shown in FIG. 5D. As the user keeps his finger on the moving-affordance icon 2722 and moves the corresponding row 2721 through the list, the other items in the list may also move to accommodate the row 2721 that is being moved (as shown in FIG. 5E).

In some embodiments, as shown in FIG. 5F, as the row 2721 that is being moved reaches a break location 2726, the corresponding item is placed in the list at a position corresponding to the break location 2726 on the touch screen display.

In some embodiments, a user may perform a finger gesture on an edit completion icon 2718. Upon detection of the finger gesture on the edit completion icon 2718, the moving-affordance icon 2722 ceases to be displayed on the touch screen display.

In some embodiments, a user may move the item within the list by performing a finger contact anywhere within a row 2720 for at least a predetermined time. For example, if a user performs a finger contact that is detected anywhere within the row 2720 of the corresponding item that they want to move for at least a predetermined time, that item becomes movable within the list. In some embodiments, the predetermined time may be several seconds long and may range from one second to five seconds. Allowing movement of an item in the list upon detection of a finger contact for at least a predetermined time permits the list to be rearranged without use of an edit initiation icon and a moving-affordance icon.

The above figures show an exemplary list that may be re-ordered. In some other embodiments, other lists that may be re-ordered as described above may include a playlist of songs, a list of phone numbers, a list of pictures, a list of files, a list of photo albums, a list of photographs, a list of videos, a list of software applications, or any other type of list not having a predetermined order.

Figure 6A:
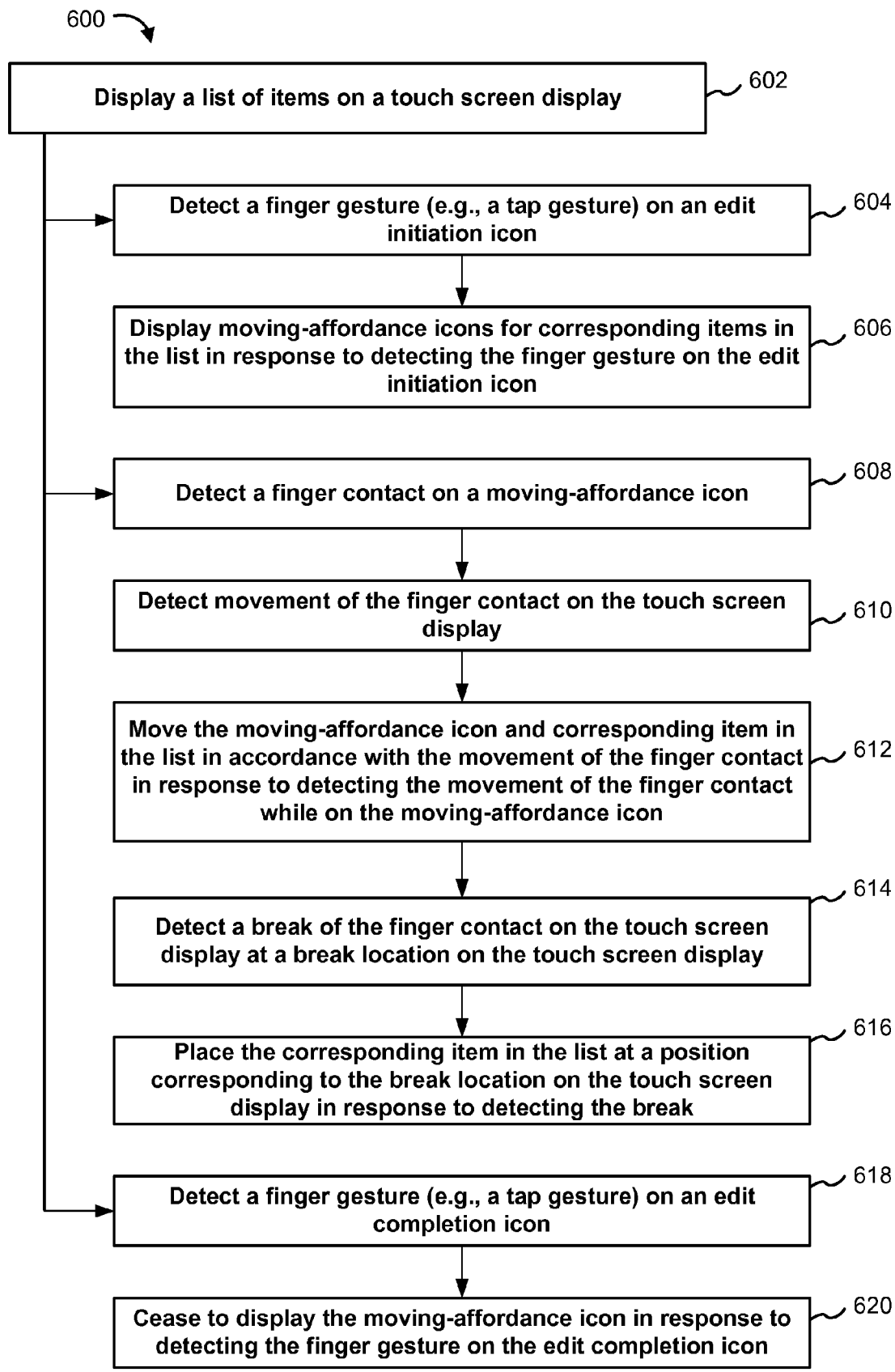
FIG. 6A-6C illustrate flow diagrams of processes for displaying and managing lists in accordance with some embodiments

FIG. 6A illustrates a flow diagram of process 600 for managing lists in accordance with some embodiments. In some embodiments, process 600 may be performed on a portable multifunction device (e.g., device 100) with a touch screen display (e.g., display 112). The portable multifunction device displays a list of items on its touch screen display (602). In some embodiments, the list is a playlist of songs, a list of phone numbers, a list of pictures, a list of files, a list of photo albums, a list of photographs, a list of videos, or a list of software applications.

A finger gesture (e.g., a tap gesture) is detected on an edit initiation icon (e.g., icon 2710) on the touch screen display (604), and the device responds by displaying moving-affordance icons (e.g., icons 2722) for corresponding items in the list (606). If a finger contact (e.g., finger contact 2724) on a respective moving-affordance icon is detected (608) and movement of the finger contact on the touch screen display is also detected (610), the device responds by moving the moving-affordance icon and the corresponding item (i.e., the user-selected item) in the list in accordance with the movement of the finger contact (612). In some embodiments, while the user-selected item is moving over a second item, the second item simultaneously moves in the list in a direction opposite movement of the user selected item.

When a break of the finger contact on the touch screen display at a break location (e.g., break location 2726) on the touch screen display is detected (614), the corresponding item in the list is placed at a position corresponding to the break location on the touch screen display in response to detecting the break (616). In some embodiments, if a finger gesture on an edit completion icon (e.g., done icon 2718) is detected (618), the device responds by ceasing display of the moving-affordance icon (620).

Figure 6B:
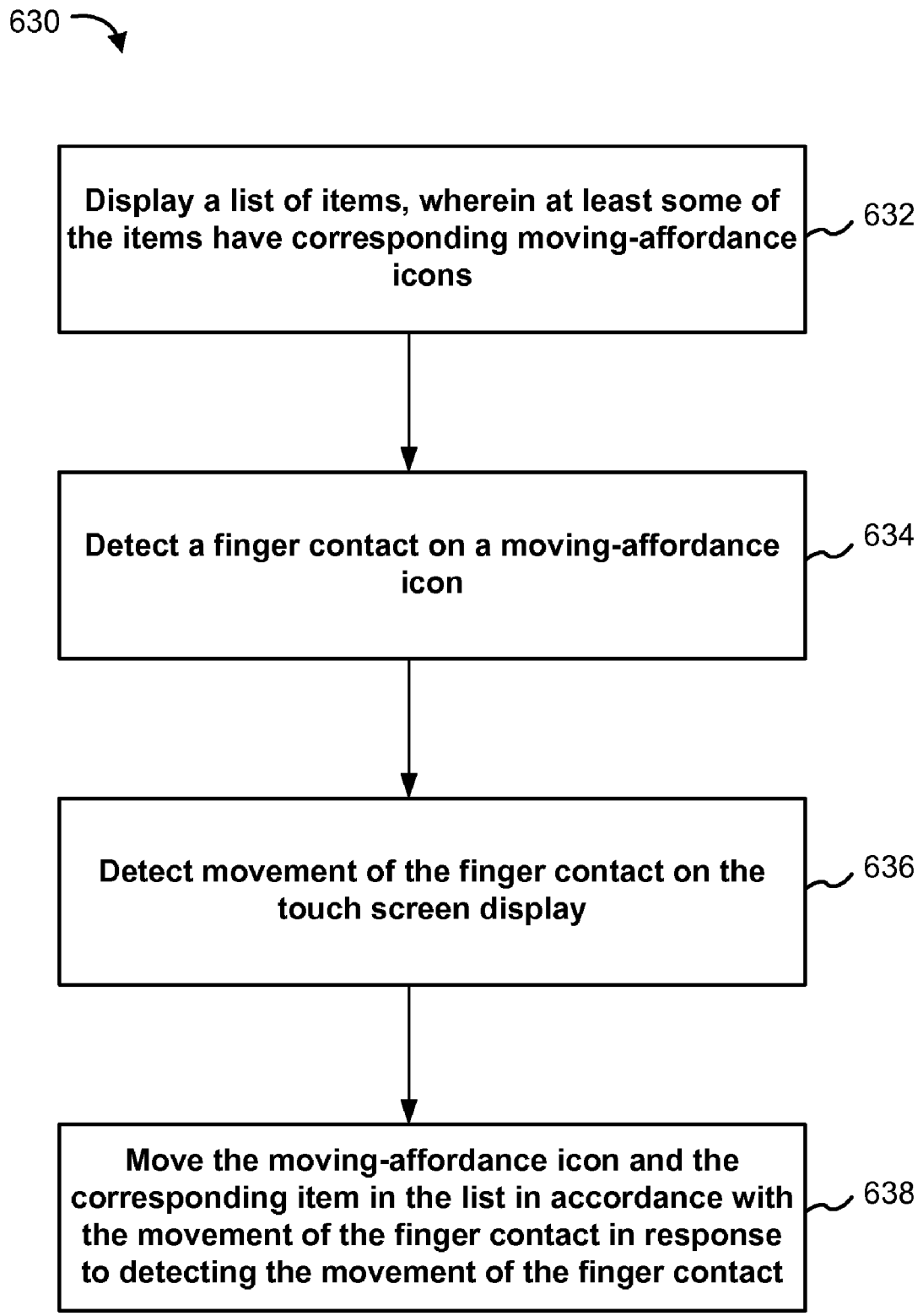

FIG. 6B illustrates a flow diagram of process 630 for managing lists in accordance with some embodiments. In some embodiments, process 630 may be performed on a portable multifunction device (e.g., device 100) with a touch screen display (e.g., display 112). The portable multifunction device displays a list of items on its touch screen display (632). In some embodiments, at least some of the items on the list have corresponding moving-affordance icons (e.g., icons 2722). When a finger contact (e.g., 2724) on a respective moving-affordance icon is detected (634) and movement of the finger contact on the touch screen display is also detected (636), the device responds by moving the corresponding item in the list in accordance with the movement of the finger contact (638). In some embodiments, where at least some of the items on the list have corresponding moving-affordance icons, the device responds by moving the moving-affordance icon and the corresponding item in the list.

Figure 6C:
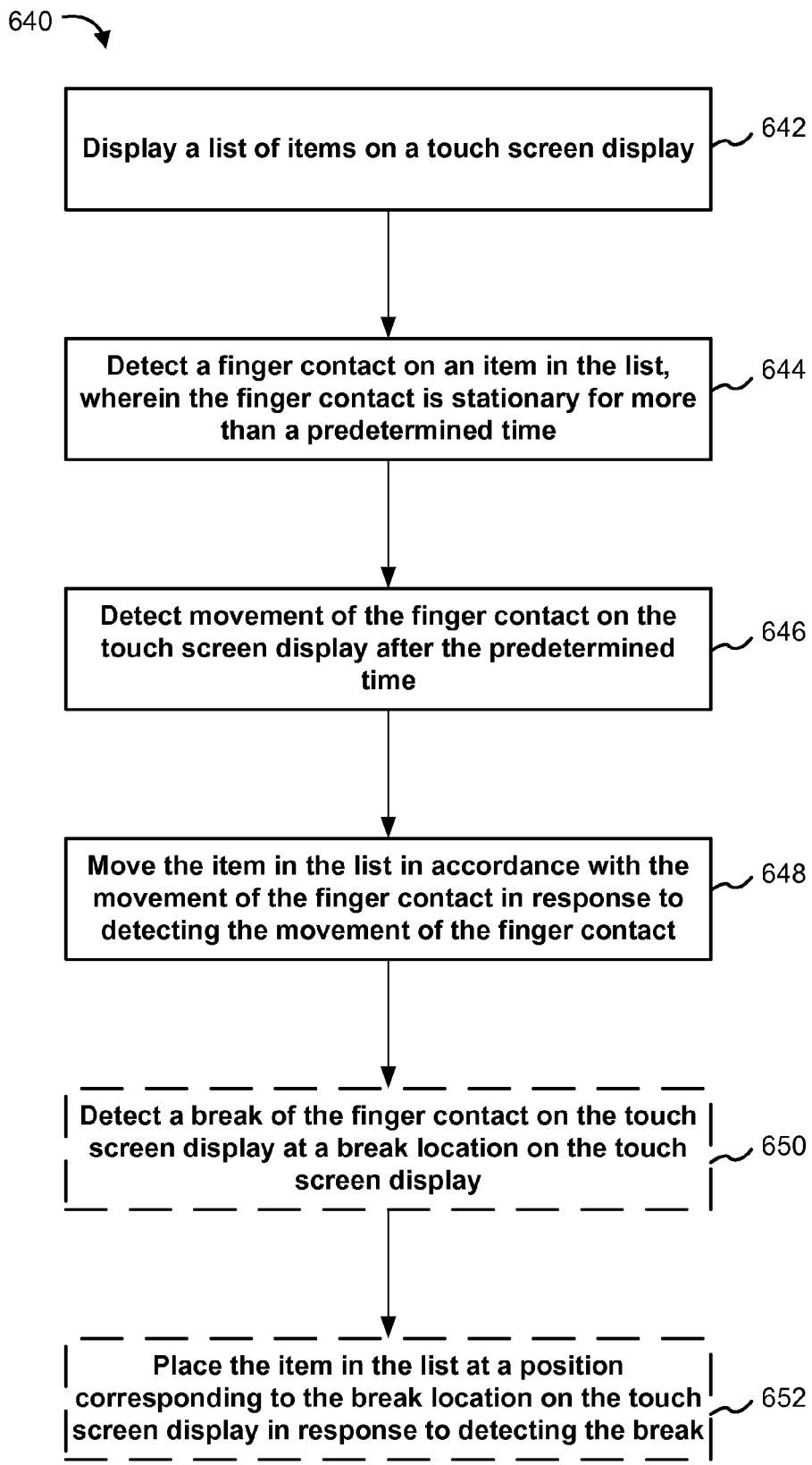

FIG. 6C illustrates a flow diagram of process 640 for managing lists in accordance with some embodiments. In some embodiments, process 640 may be performed on a portable multifunction device (e.g., device 100) with a touch screen display (e.g., device 112). The portable multifunction device displays a list of items on its touch screen display (642). In some embodiments, the list of items is a playlist of songs, a list of phone numbers, a list of pictures, a list of files, a list of photo albums, a list of photographs, a list of videos, or a list of software applications.

When a finger contact on an item in the list (e.g., a finger contact anywhere within a row 2720) is stationary for more than a predetermined time (644) and movement of the finger contact after the predetermined time is detected (646), the device responds by moving the item in the list in accordance with the movement of the finger contact (648). In some embodiments, the predetermined time may last up to several seconds and may range from one second, in some embodiments, to five seconds in other embodiments.

In some embodiments, while the finger-contacted item in the list is moving over a second item, the second item simultaneously moves in the list in a direction opposite movement of the finger-contacted item.

In some embodiments, a break of the finger contact on the touch screen display at a break location may be detected (650), and the item is placed in the list at a position corresponding to the break location on the touch screen display (652).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a portable multifunction device with a touch screen display:
displaying a list of items on the touch screen display;
while displaying the list of items, detecting a gesture on the touch screen display to initiate an edit mode;
in response to detecting the gesture to initiate the edit mode:
maintaining display of the list, and
displaying separate moving-affordance icons and deletion icons for each corresponding item in the list;
detecting a contact on a moving-affordance icon;
detecting movement of the contact while the contact is on the moving-affordance icon;
in response to detecting the movement of the contact while the contact is on the moving-affordance icon, moving the moving-affordance icon and the corresponding item in the list in accordance with the movement of the contact;
detecting a break of the contact on the touch screen display at a break location on the touch screen display;
in response to detecting the break, placing the corresponding item in the list at a position corresponding to the break location on the touch screen display;
detecting a gesture on a deletion icon for a respective item in the list;
in response to detecting the gesture on the deletion icon for the respective item in the list, initiating a deletion process to delete the respective item in the list;

after placing the corresponding item in the list at the position corresponding to the break location on the touch screen display and after initiating the deletion process to delete the respective item in the list, displaying a modified list of items;

while displaying the modified list of items, detecting a gesture on the touch screen display to complete the edit mode;

in response to detecting the gesture to complete the edit mode, ceasing to display the moving-affordance icons and the deletion icons and maintaining display of the modified list of items.

2. The method of claim 1, wherein the list of items is a playlist of songs, a list of phone numbers, a list of pictures, a list of files, a list of photo albums, a list of photographs, a list of videos, or a list of software applications.

3. The method of claim 1, wherein the contact on the moving-affordance icon is a tap gesture.

4. The method of claim 1, wherein the moving corresponding item comprises a user selected item, the method including, while the user selected item in the list is moving over a second item, simultaneously moving the second item in the list in a direction opposite movement of the user selected item.

5. A graphical user interface on a portable multifunction device with a touch screen display, a memory and, and one or more processors to execute one or more programs stored in the memory, the graphical user interface comprising:
   a list of items on the touch screen display;
   wherein:
      in response to detecting a gesture on the touch screen display to initiate an edit mode while displaying the list of items, separate moving-affordance icons and deletion icons are displayed for each corresponding item in the list and display of the list is maintained;
      in response to detecting movement of a contact while the contact is on a moving-affordance icon, the moving-affordance icon and the corresponding item are moved in the list in accordance with the movement of the contact;
      in response to detecting a break of the contact on the touch screen display at a break location on the touch screen display, the corresponding item in the list is placed at a position corresponding to the break location on the touch screen display;
      in response to detecting a gesture on a deletion icon for a respective item in the list, a deletion process is initiated to delete the respective item in the list; and
      after placing the corresponding item in the list at the position corresponding to the break location on the touch screen display and after initiating a deletion process to delete the respective item in the list, a modified list of items is displayed;
      in response to detecting a gesture on the touch screen to complete the edit mode, the moving-affordance icons and the deletions icons cease to be displayed and display of the modified list of items is maintained.

6. A portable multifunction device, comprising:
a touch screen display;
one or more processors;
memory; and
one or more programs, wherein the one or more programs are stored in the memory and configured to be executed by the one or more processors, the one or more programs including instructions for:
   displaying a list of items on the touch screen display;
   while displaying the list of items, detecting a gesture on the touch screen display to initiate an edit mode;
   in response to detecting the gesture to initiate the edit mode:
      maintaining display of the list, and
      displaying separate moving-affordance icons and deletion icons for each corresponding item in the list;
   detecting a contact on a moving-affordance icon;
   detecting movement of the contact while the contact is on the moving-affordance icon;
   in response to detecting the movement of the contact while the contact is on the moving-affordance icon, moving the moving-affordance icon and the corresponding item in the list in accordance with the movement of the contact;
   detecting a break of the contact on the touch screen display at a break location on the touch screen display;
   in response to detecting the break, placing the corresponding item in the list at a position corresponding to the break location on the touch screen display;
   detecting a gesture on a deletion icon for a respective item in the list;
   in response to detecting the gesture on the deletion icon for the respective item in the list, initiating a deletion process to delete the respective item in the list;
   detecting a gesture on the touch screen display to complete the edit mode;
   after placing the corresponding item in the list at the position corresponding to the break location on the touch screen display and after initiating a deletion process to delete the respective item in the list, displaying a modified list of items;
   while displaying the modified list of items, in response to detecting the gesture to complete the edit mode, ceasing to display the moving-affordance icons and the deletion icons and maintaining display of the modified list of items.

7. A non-transitory computer readable storage medium storing one or more programs, the one or more programs comprising instructions, which when executed by a portable multifunction device with a touch screen display, cause the portable multifunction device to perform a method comprising:
   displaying a list of items on the touch screen display;
   while displaying the list of items detecting a gesture on the touch screen display to initiate an edit mode;
   in response to detecting the gesture to initiate the edit mode:
      maintaining display of the list, and
      displaying separate moving-affordance icons and deletion icons for each corresponding item in the list;
   detecting a contact on a moving-affordance icon;
   detecting movement of the contact while the contact is on the moving-affordance icon;
   in response to detecting the movement of the contact while the contact is on the moving-affordance icon, moving the moving-affordance icon and the corresponding item in the list in accordance with the movement of the contact;
   detecting a break of the contact on the touch screen display at a break location on the touch screen display;
   in response to detecting the break, placing the corresponding item in the list at a position corresponding to the break location on the touch screen display;
   detecting a gesture on a deletion icon for a respective item in the list;
   in response to detecting the gesture on the deletion icon for the respective item in the list, initiating a deletion process to delete the respective item in the list;

after placing the corresponding item in the list at the position corresponding to the break location on the touch screen display and after initiating a deletion process to delete the respective item in the list, displaying a modified list of items;

while displaying the modified list of items, detecting a gesture on the touch screen display to complete the edit mode;

in response to detecting the gesture to complete the edit mode, ceasing to display the moving-affordance icons and the deletion icons and maintaining display of the modified list of items.

8. The method of claim 1, wherein the gesture to initiate the edit mode comprises a gesture on an edit initiation icon and wherein the gesture to complete the edit mode comprises a gesture on an edit completion icon.

9. The method of claim 1, further comprising highlighting the corresponding item in the list in response to detecting the contact on the moving-affordance icon.

10. The portable multifunction device of claim 6, wherein the list of items is a playlist of songs, a list of phone numbers, a list of pictures, a list of files, a list of photo albums, a list of photographs, a list of videos, or a list of software applications.

11. The portable multifunction device of claim 6, wherein the contact on the moving-affordance icon is a tap gesture.

12. The portable multifunction device of claim 6, wherein the moving corresponding item comprises a user selected item, the method including, while the user selected item in the list is moving over a second item, simultaneously moving the second item in the list in a direction opposite movement of the user selected item.

13. The portable multifunction device of claim 6, further including instructions for highlighting the corresponding item in the list in response to detecting the contact on the moving-affordance icon.

14. The portable multifunction device of claim 6, wherein the gesture to initiate the edit mode comprises a gesture on an edit initiation icon and wherein the gesture to complete the edit mode comprises a gesture on an edit completion icon.

15. The non-transitory computer readable storage medium of claim 7, wherein the list of items is a playlist of songs, a list of phone numbers, a list of pictures, a list of files, a list of photo albums, a list of photographs, a list of videos, or a list of software applications.

16. The non-transitory computer readable storage medium of claim 7, wherein the contact on the moving-affordance icon is a tap gesture.

17. The non-transitory computer readable storage medium of claim 7, wherein the moving corresponding item comprises a user selected item, the method including, while the user selected item in the list is moving over a second item, simultaneously moving the second item in the list in a direction opposite movement of the user selected item.

18. The non-transitory computer readable storage medium of claim 7, further comprising instructions, which when executed by the portable multifunction device, cause the portable multifunction device to highlight the corresponding item in the list in response to detecting the contact on the moving-affordance icon.

19. The non-transitory computer readable storage medium of claim 7, wherein the gesture to initiate an edit mode comprises a gesture on an edit initiation icon and wherein the gesture to complete the edit mode comprises a gesture on an edit completion icon.

* * * * *